(12) United States Patent
LaRosa (10) Patent No.: US 10,731,349 B2
(45) Date of Patent: Aug. 4, 2020

(54) GUTTER CLEANER AND A BUCKET HANGER

(71) Applicant: Michael LaRosa, Rochester, NY (US)

(72) Inventor: Michael LaRosa, Rochester, NY (US)

(*) Notice: Subject to any disclaimer, the term of this patent is extended or adjusted under 35 U.S.C. 154(b) by 0 days.

(21) Appl. No.: 16/174,349

(22) Filed: Oct. 30, 2018

(65) Prior Publication Data
US 2020/0131777 A1  Apr. 30, 2020

(51) Int. Cl.
*E04D 13/076* (2006.01)
*F16M 13/02* (2006.01)
*F16B 45/00* (2006.01)

(52) U.S. Cl.
CPC ....... *E04D 13/0765* (2013.01); *F16M 13/022* (2013.01); *F16B 45/00* (2013.01)

(58) Field of Classification Search
CPC .... E04D 13/0765; F16M 13/022; F16B 45/00
USPC .............. 15/236.01, 236.04, 236.05, 236.06, 15/236.09
See application file for complete search history.

(56) References Cited

U.S. PATENT DOCUMENTS

| | | | |
|---|---|---|---|
| 2,262,282 A | 8/1940 | Helgason | |
| 2,299,418 A * | 10/1942 | Thomas | E04D 13/0765 294/176 |
| 2,519,732 A | 3/1947 | Bartolat | |
| 2,991,037 A | 5/1960 | Becher, Jr. | |
| 3,601,835 A * | 8/1971 | Morgan | E04D 13/0765 15/25 |
| 3,626,542 A * | 12/1971 | Despain | E04D 13/0765 15/236.04 |
| 3,743,339 A * | 7/1973 | Brackett | E04D 13/0765 294/119.1 |
| 3,858,267 A * | 1/1975 | Swannie | E04D 13/0765 15/236.04 |
| 4,194,780 A * | 3/1980 | Dilley | E04D 13/0765 15/236.04 |
| 4,304,498 A | 12/1981 | George | |
| 4,310,940 A | 1/1982 | Moore | |
| 4,542,553 A * | 9/1985 | Cary | E04D 13/0765 15/143.1 |
| 4,549,611 A * | 10/1985 | Mills | A01B 1/20 111/99 |
| 4,726,090 A * | 2/1988 | Kilpatrick | E04D 13/0765 15/144.1 |
| 5,288,118 A * | 2/1994 | Hartselle, III | A47L 11/38 15/236.04 |

(Continued)

*Primary Examiner* — Marc Carlson
(74) *Attorney, Agent, or Firm* — Michael J. Nickerson; Basch & Nickerson LLP (57) ABSTRACT

A gutter cleaning tool includes a cleaning blade having a first edge, a second edge, and a third edge and a handle attached to the cleaning blade. The first edge of the cleaning blade engages a bottom of a gutter. The second edge of the cleaning blade engages an exterior side wall of the gutter, the exterior side wall of the gutter being away from a roof. The third edge of the cleaning blade engages the handle and attaching to the handle. The third edge of the cleaning blade and the first edge of the cleaning blade form an angle, the angle being less than ninety degrees. The handle follows the third edge of the cleaning blade such that the handle follows the angle. The handle extends beyond the gutter in a direction away from the roof.

8 Claims, 7 Drawing Sheets

(56) References Cited

U.S. PATENT DOCUMENTS

| | | | |
|---|---|---|---|
| 6,237,974 B1 * | 5/2001 | Chisholm | E04D 13/0765 15/236.04 |
| 6,428,067 B1 * | 8/2002 | Barragan | E04D 13/0765 15/236.04 |
| 6,454,329 B1 | 9/2002 | Collins, Jr. | |
| 6,474,607 B1 | 11/2002 | Wilson | |
| 6,497,317 B1 | 12/2002 | Chun | |
| 6,585,204 B1 | 7/2003 | Haertzen | |
| 6,925,676 B2 * | 8/2005 | Heavner | E04D 13/0765 15/236.04 |
| 7,076,828 B2 * | 7/2006 | Hewlett | E04D 13/0765 15/236.01 |
| 7,740,296 B2 | 6/2010 | DaVia | |
| 7,789,358 B1 | 9/2010 | Adams | |
| 8,104,133 B2 * | 1/2012 | Paterson | E04D 13/0765 15/236.01 |
| D670,881 S * | 11/2012 | Tonge | D32/49 |
| D777,389 S * | 1/2017 | Brandt | D32/35 |
| 9,790,740 B2 | 10/2017 | Bardill et al. | |
| 2003/0213086 A1 * | 11/2003 | Heavner | E04D 13/0765 15/236.04 |
| 2005/0093315 A1 * | 5/2005 | Mitchener | E04D 13/0765 294/51 |
| 2009/0249575 A1 | 10/2009 | Paterson | |
| 2009/0293217 A1 | 12/2009 | Paterson | |
| 2009/0315354 A1 | 12/2009 | DaVia | |
| 2014/0246046 A1 | 9/2014 | Pullen et al. | |
| 2015/0296972 A1 | 10/2015 | Pender | |
| 2015/0368905 A1 | 12/2015 | Nichols | |
| 2016/0201330 A1 | 7/2016 | Paton | |
| 2016/0206172 A1 | 7/2016 | Pullen et al. | |
| 2016/0340906 A1 | 11/2016 | Nichols | |
| 2016/0360875 A1 | 12/2016 | Pender | |
| 2017/0022715 A1 | 1/2017 | Bohrman | |

* cited by examiner

GUTTER CLEANER AND A BUCKET HANGER

BACKGROUND

Figure 1:
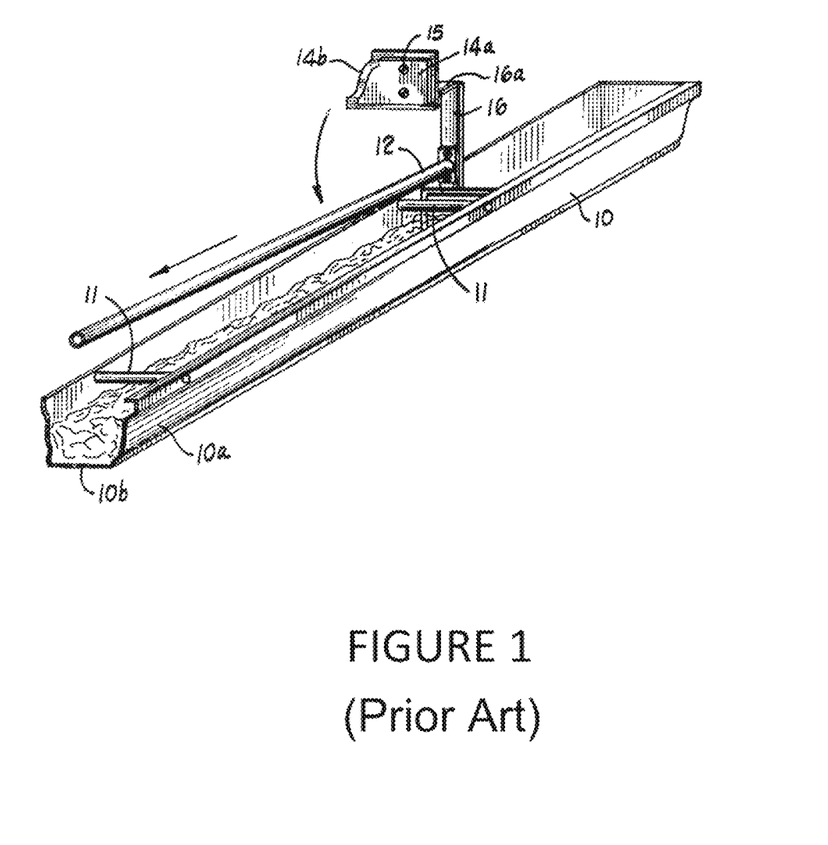
FIG. 1 shows a conventional gutter cleaning tool.

An arduous task of the homeowner is the cleaning of leaves and other debris from the gutters of a home. A conventional gutter cleaning tool, as disclosed in U.S. Pat. No. 4,194,780, used in cleaning the gutters of a home is illustrated in FIG. 1. The entire content of U.S. Pat. No. 4,194,780 is hereby incorporated by reference.

As illustrated in FIG. 1, a portion of a gutter 10 is shown as it is usually attached to the eaves of a roof. It is well known that such gutters have many cross-struts 11, consisting of long spikes inside metal collars, along the length thereof. These cross-struts 11 have a dual function.

The long spikes are driven through the top of both walls of the gutter and into the house (immediately under the roof) thus securing the gutter 10 to the house, while the metal collars separate the gutter walls from each other, pin the inside wall of the gutter 10 firmly against the house and pinch the outside wall of the gutter 10 firmly against the heads of the spikes. The side walls 10a and the bottom 10b of the gutter 10 are usually formed out of one piece of sheet metal.

The conventional gutter cleaning tool includes an elongated handle 12 to one end of which is attached rigidly to an arm at a right angle to handle 12 which extends a sufficient distance to enter the gutter 10 and scrape the bottom 10b and walls 10a thereof when the handle 12 is held above and parallel to the gutter 10.

Rigidly fastened on one end of the arm is a first paddle. The first paddle comprises parallel metal plate members on opposite sides of a scraping member which preferably is of rubber or plastic sufficiently stiff to push leaves along the length of the gutter 10. The paddle is rigidly fastened as by bolts to the arm and plates. The paddle roughly has the same contour as the interior walls of the gutter 10.

At another end 16 of the arm is rigidly fastened to the handle 12 and extends at a right angle away from the handle. The another end 16 of the arm extends at a right angle for approximately the same length as the other end of the arm and then is bent at a right angle for an offset portion 16a which extends parallel to the handle 12 and towards the operators end of the handle 12.

The member 16a turns vertically upward and is attached to a second paddle sufficiently lower or smaller in height than the first paddle so that it can be pulled under the cross-struts. The second paddle includes plate members 14a for supporting a scraper member 14b by means of bolts 15.

One of the issues in using the conventional gutter cleaning tool is that gutter cleaning tool is not compact, requiring a user to engage the gutter at a distance from the user's position.

Therefore, it is desirable to provide a gutter cleaning tool that a user can engage the gutter without having the gutter cleaning tool engage the roof shingle overhang.

It is further desirable to provide a gutter cleaning tool that is compact and is able to effectively clean gutters.

BRIEF DESCRIPTION OF THE DRAWINGS

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 2:
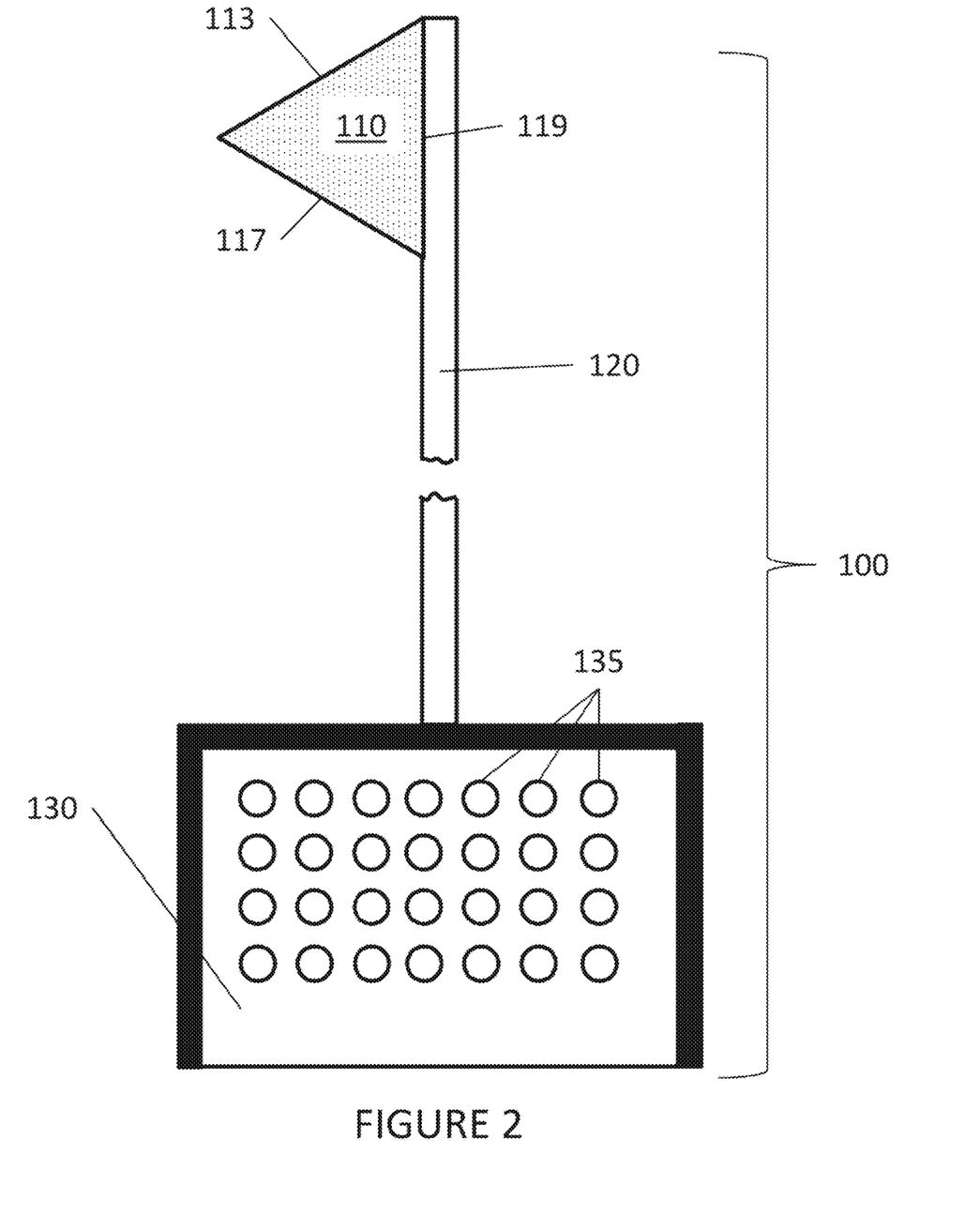
FIG. 2 shows an example of a gutter cleaning tool.

FIG. 2 shows an example of a gutter cleaning tool. As illustrated in FIG. 2, a gutter cleaner 100 includes a cleaning blade 110 that includes a bottom edge 113 which is shaped to travel along a bottom of a gutter. The cleaning blade 110 further includes a side edge 117 which is shaped to travel along a side wall, namely the outside wall of the gutter.

In this embodiment, there is no back edge so that the cleaning blade 110 fits beneath any roof shingle overhanging the open end (top) of the gutter. The cleaning blade 110 includes a top edge 119 that angles away from the backside of the gutter at an angle less than 90°. The top edge 119 is attached to a handle 120 which follows the angle of the top edge 119. The handle 120 projects beyond the cleaning blade 110 so that a user can manipulate the gutter cleaner 100 to travel along (move debris) the gutter.

The handle may include, at an opposite end, a shovel like blade 130 to enable the removing of debris from the gutter. The shovel like blade 130 may include holes 135 to strain the debris from the water in the gutter.

Figure 3:
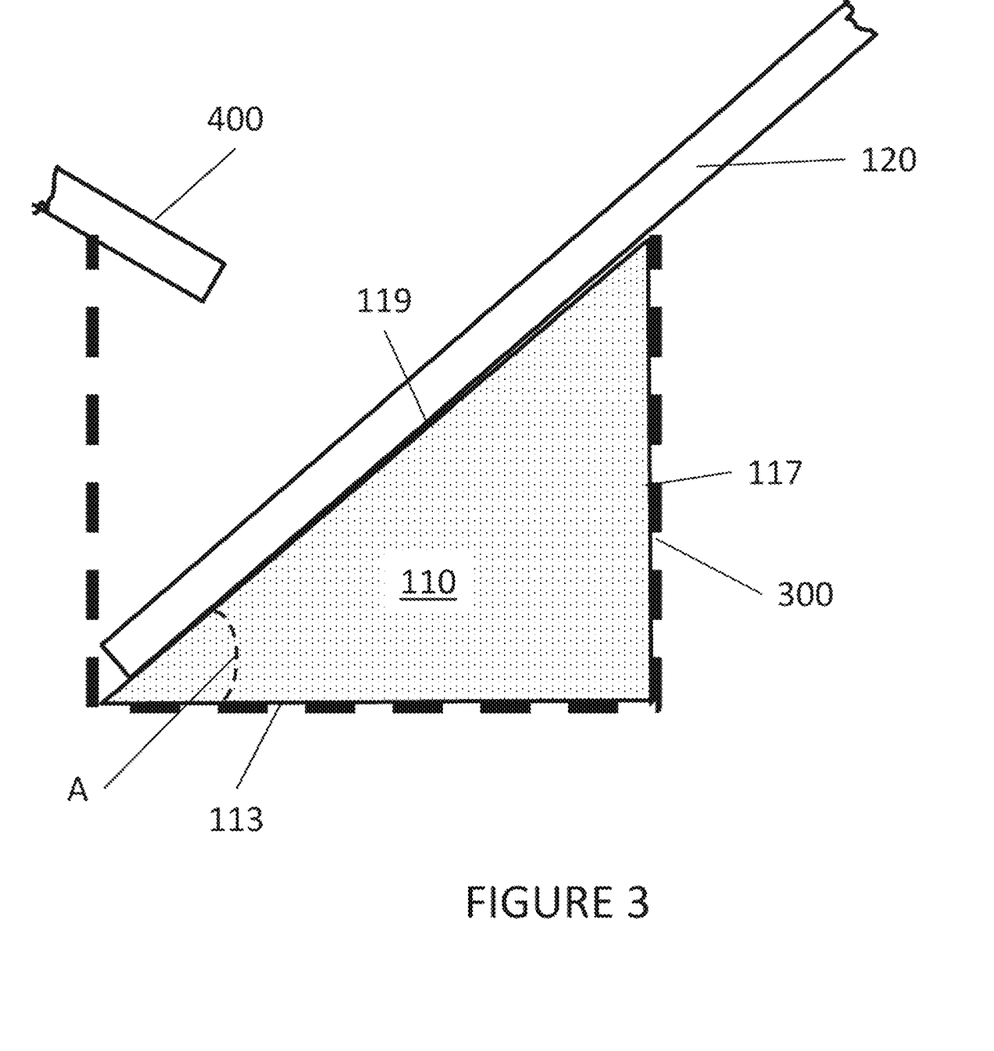
FIG. 3 shows the gutter cleaning tool of FIG. 2 engaged with a gutter.

FIG. 3 illustrates the gutter cleaning tool 100 of FIG. 2 engaged with a gutter 300. As illustrated in FIG. 3, the cleaning blade 110 that includes bottom edge 113 which is shaped to travel along a bottom of a gutter 300 (dotted line). The cleaning blade 110 further includes side edge 117 which is shaped to travel along a side wall, namely the outside wall of the gutter 300.

Is further illustrated in FIG. 3, there is no back edge so that the cleaning blade 110 fits beneath any roof shingle 400 overhanging the open end (top) of the gutter. The cleaning blade 110 includes a top edge 119 that angles away from the backside of the gutter at an angle less than 90°. In other words, the top edge 119 and the bottom edge 113 form an angle (A) less than 90°.

The top edge 119 is attached to a handle 120 which follows the angle of the top edge 119. The handle 120 projects beyond the cleaning blade 110 so that a user can manipulate the gutter cleaner 100 to travel along (move debris) the gutter 300.

Figure 4:
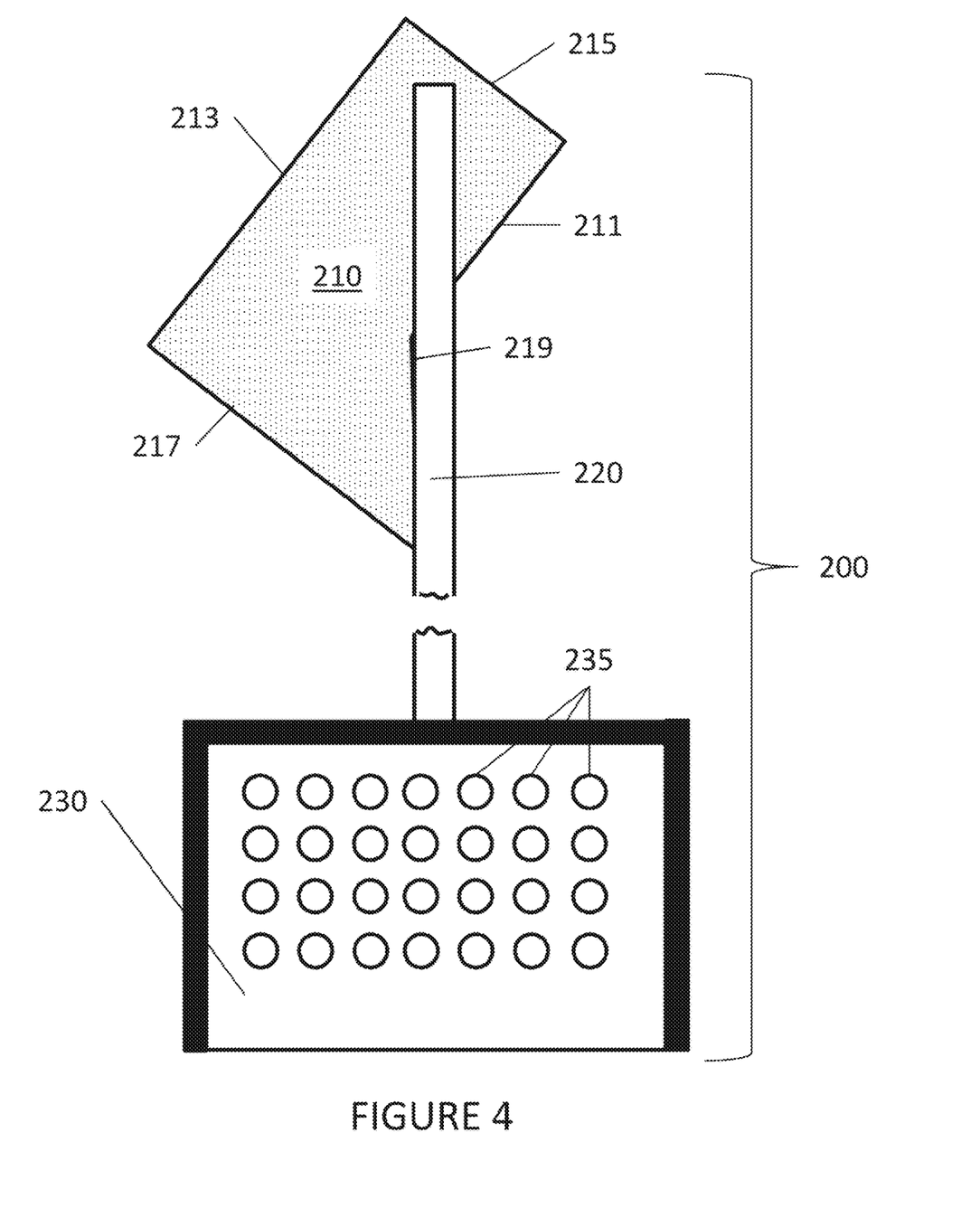
FIG. 4 shows another example of a gutter cleaning tool.

FIG. 4 shows another example of a gutter cleaning tool. As illustrated in FIG. 4, a gutter cleaner 200 includes a cleaning blade 210 that includes a bottom edge 213 which is shaped to travel along a bottom of a gutter. The cleaning blade 210 further includes a front side edge 217 which is shaped to travel along a side wall, namely the outside wall of the gutter.

In this embodiment, there is a back side edge 215 which engages a back wall of a gutter. The back side edge 215 is shorter in length than the front side edge 217 so that the back side edge 215 fits beneath a roof shingle overhanging the open end (top) of the gutter. The back side edge 215 transitions into a first top edge 211 which is parallel to a bottom of a gutter which further transitions a second top edge 219. The second top edge 219 angles away from the backside of the gutter at an angle (B of FIG. 5) less than 90° or angles away from the first top edge 211 at an angle greater than 90°.

The second top edge 219 is attached to a handle 220 which follows the angle of the second top edge 219. The handle 220 projects beyond the cleaning blade 210 so that a user can manipulate the gutter cleaner 200 to travel along (move debris) the gutter.

The handle may include, at an opposite end, a shovel like blade 230 to enable the removing of debris from the gutter. The shovel like blade 230 may include holes 235 to strain the debris from the water in the gutter.

Figure 5:
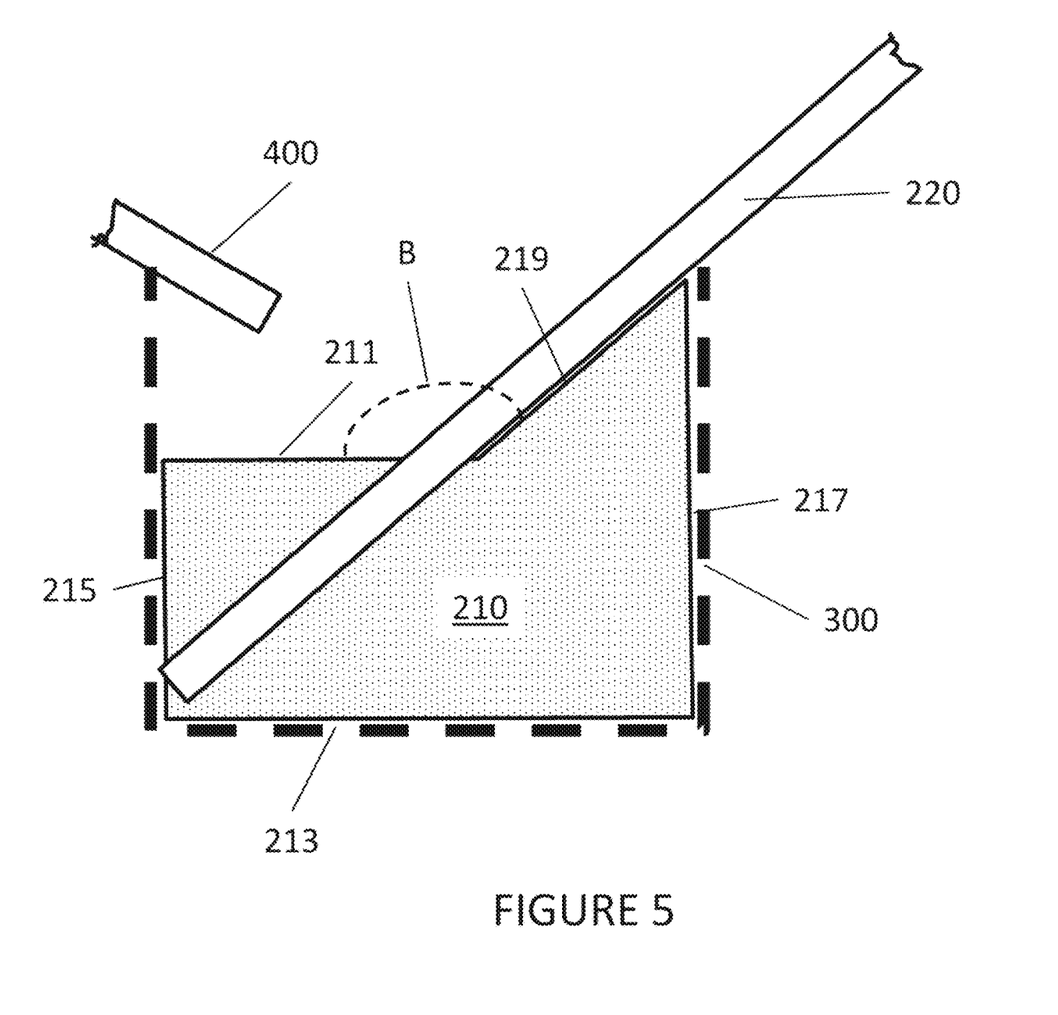
FIG. 5 shows the gutter cleaning tool of FIG. 4 engaged with a gutter.

FIG. 5 illustrates the gutter cleaning tool 100 of FIG. 4 engaged with a gutter 300. As illustrated in FIG. 5, the cleaning blade 210 that includes bottom edge 213 which is shaped to travel along a bottom of a gutter 300 (dotted line). The cleaning blade 210 further includes side edge 217 which is shaped to travel along a side wall, namely the outside wall of the gutter 300.

Is further illustrated in FIG. 5, there is a back side edge 215 which engages a back wall of the gutter 300. The back side edge 215 is shorter in length than the front side edge 217 so that the back side edge 215 fits beneath a roof shingle 400 overhanging the open end (top) of the gutter 300.

The back side edge 215 transitions into a first top edge 211 which is parallel to a bottom of the gutter 300 which further transitions a second top edge 219. The second top edge 219 angles away from the backside of the gutter at an angle (B) less than 90°. The cleaning blade 110 includes a top edge 119 that angles away from the backside of the gutter at an angle less than 90°.

The second top edge 219 is attached to a handle 220 which follows the angle of the second top edge 219. The handle 220 projects beyond the cleaning blade 210 so that a user can manipulate the gutter cleaner 200 to travel along (move debris) the gutter 300.

Figure 6:
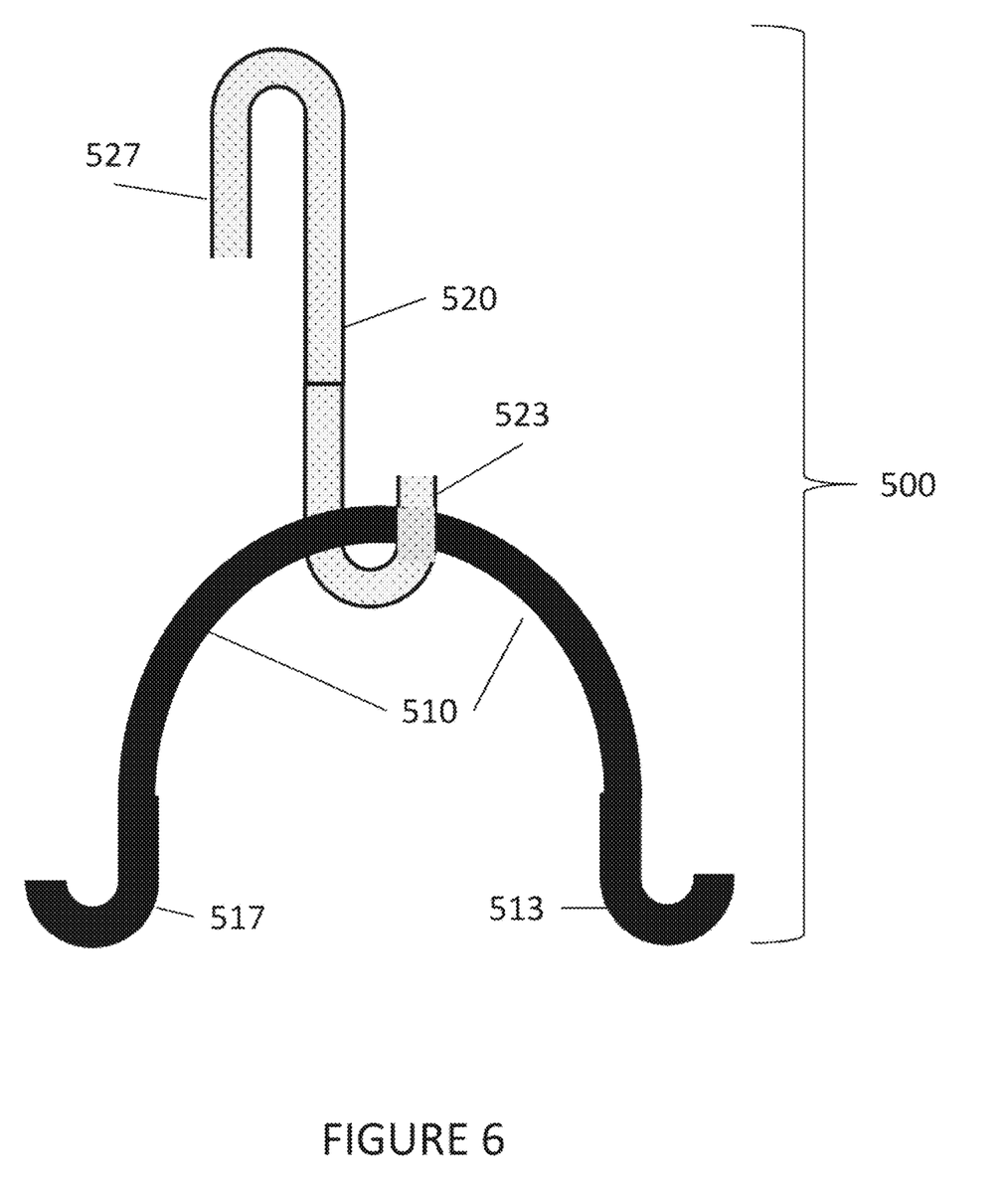
FIG. 6 shows a bucket hanging device.

FIG. 6 shows a bucket hanging device. As illustrated in FIG. 6, a bucket hanging device 500 includes a hook member 520 for attaching the bucket hanging device 500 to a ladder or other support apparatus. The bucket hanging device 500 also includes a U-shaped attachment member 510 for attaching to a bucket on either side of a bucket handle grip.

The hook member 520 includes a hook 523 for attaching the hook member 520 to the U-shaped attachment member 510. The hook 523 may be slightly open to allow disengagement between the hook member 520 and the U-shaped attachment member 510. The hook member 520 includes a hook 527 for attaching the hook member 520 to a ladder or other support apparatus.

U-shaped attachment member 510 includes a first hook 513 and a second hook 517 for attaching the U-shaped attachment member 510 to a bucket on either side of a bucket handle grip.

The U-shaped attachment member 510 allows the bucket hanging device 500 to stabilize a bucket from tipping due to the handle sliding along the U-shaped attachment member 510.

Figure 7:
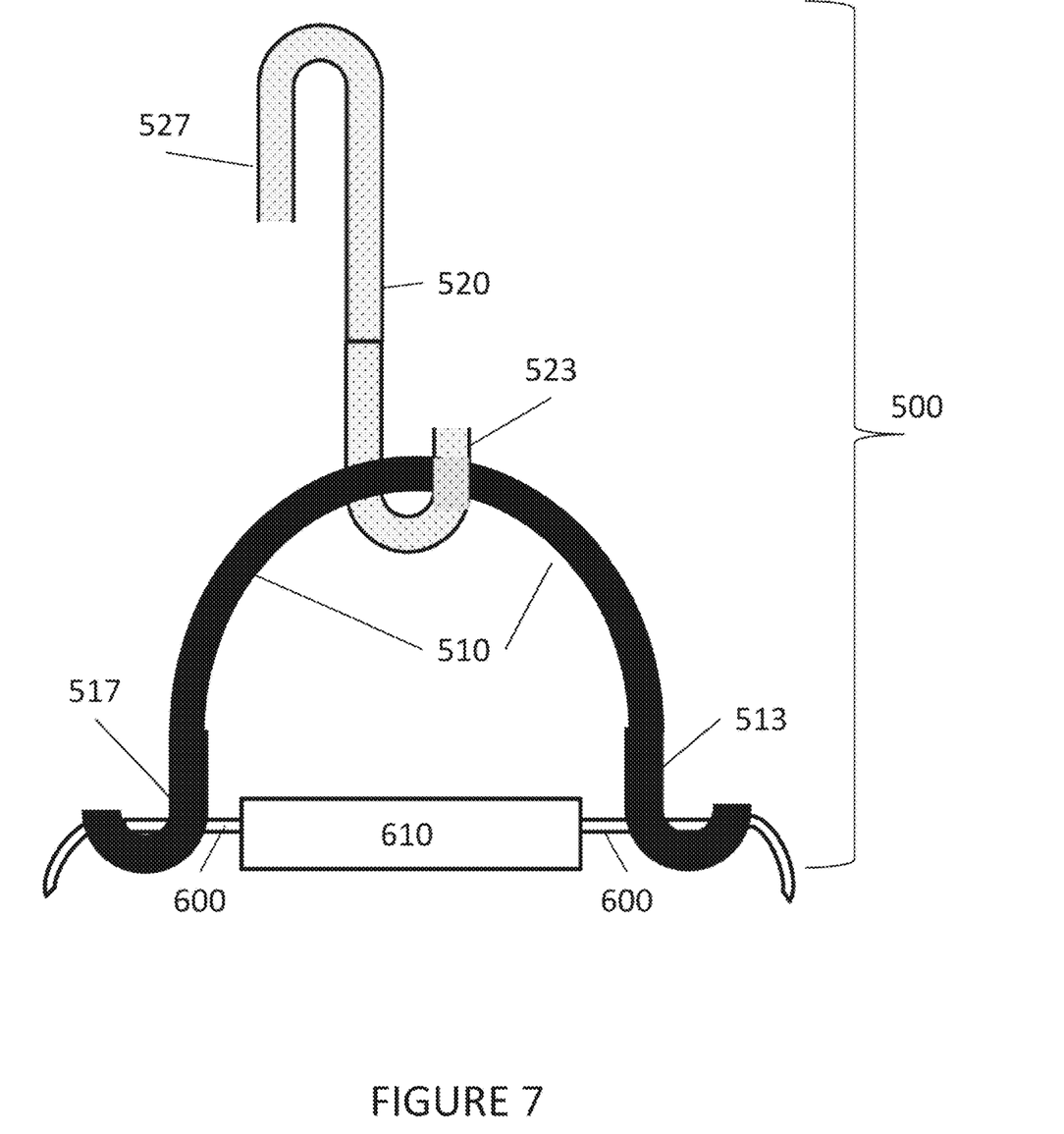
FIG. 7 shows the bucket hanging device of FIG. 6 engaged with a handle of a bucket.

FIG. 7 shows the bucket hanging device 500 of FIG. 6 engaged with a handle of a bucket. As illustrated in FIG. 7, the first hook 513 and the second hook 517 of the U-shaped attachment member 510 engage a bucket handle 600 on either side of a bucket handle grip 610. The U-shaped attachment member 510 allows the bucket hanging device 500 to stabilize a bucket from tipping due to the bucket handle 600 sliding along the U-shaped attachment member 510.

It is noted that in the various embodiments described above with respect to the gutter cleaning tool may include a striking member located on the same end of the handle as the cleaning blade. The striking member is located on an opposite side of the handle of the cleaning blade. The striking handle enables a user to hammer spikes to secure the gutter.

In summary, a gutter cleaning tool includes a cleaning blade having a first edge, a second edge, and a third edge and a handle attached to the cleaning blade; the first edge of the cleaning blade for engaging a bottom of a gutter; the second edge of the cleaning blade for engaging an exterior side wall of the gutter, the exterior side wall of the gutter being away from a roof; the third edge of the cleaning blade for engaging the handle and attaching to the handle; the third edge of the cleaning blade and the first edge of the cleaning blade forming an angle, the angle being less than ninety degrees; the handle following the third edge of the cleaning blade such that the handle follows the angle; the handle extending beyond the gutter in a direction away from the roof.

The gutter cleaning tool may include a shovel blade attached to the handle at an end of the handle opposite the cleaning blade. The shovel blade may include drain holes therein.

The gutter cleaning tool may include a striking member attached to the handle at same end of the handle as the cleaning blade.

A gutter cleaning tool includes a cleaning blade having a first edge, a second edge, a third edge, a fourth edge, and a fifth edge; and a handle attached to the cleaning blade; the first edge of the cleaning blade for engaging a bottom of a gutter; the second edge of the cleaning blade for engaging an exterior side wall of the gutter, the exterior side wall of the gutter being away from a roof; the third edge of the cleaning blade for engaging an interior side wall of the gutter, the interior side wall of the gutter being adjacent to the roof; the third edge of the cleaning blade being shorter in length than the second edge of the cleaning blade the fourth edge of the cleaning blade being orthogonal to the third edge of the cleaning blade and parallel to the first edge of the cleaning blade; the fifth edge of the cleaning blade for engaging the handle and attaching to the handle; the fourth edge of the cleaning blade and the fifth edge of the cleaning blade forming an angle, the angle being greater than ninety degrees; the handle following the fifth edge of the cleaning blade such that the handle follows the angle; the handle extending beyond the gutter in a direction away from the roof.

The gutter cleaning tool may include a shovel blade attached to the handle at an end of the handle opposite the cleaning blade. The shovel blade may include drain holes therein.

The gutter cleaning tool may include a striking member attached to the handle at same end of the handle as the cleaning blade.

A bucket hanging device includes a hook member for attaching the bucket hanging device to a support apparatus; and a U-shaped attachment member for attaching to a bucket handle; the hook member including a first hook for attaching the hook member to the U-shaped attachment member and a second hook for attaching the hook member to the support apparatus; the U-shaped attachment member including a first hook and a second hook for attaching the U-shaped attachment member to the bucket handle on either side of a bucket handle grip to stabilize a bucket from tipping.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A gutter cleaning tool, comprising:
   a cleaning blade having a first edge, a second edge, and a third edge; and
   a handle attached to said cleaning blade;
   said first edge of said cleaning blade for engaging a bottom of a gutter;
   said second edge of said cleaning blade for engaging an exterior side wall of the gutter, the exterior side wall of the gutter being away from a roof;
   said third edge of said cleaning blade engaging said handle and attaching to said handle;
   said third edge of said cleaning blade physically intersecting said first edge of said cleaning blade to form a physical angle, said physical angle being less than ninety degrees;
   said handle following said third edge of said cleaning blade;
   said handle extending beyond the gutter in a direction away from the roof.

2. The gutter cleaning tool as claimed in claim 1, further comprising:
   a shovel blade attached to said handle at an end of said handle opposite said cleaning blade.

3. The gutter cleaning tool as claimed in claim 2, wherein said shovel blade include drain holes therein.

4. The gutter cleaning tool as claimed in claim 1, further comprising:
   a striking member attached to said handle at same end of said handle as said cleaning blade.

5. A gutter cleaning tool, comprising:
   a cleaning blade having a first edge, a second edge, a third edge, a fourth edge, and a fifth edge; and
   a handle attached to said cleaning blade;
   said first edge of said cleaning blade for engaging a bottom of a gutter;
   said second edge of said cleaning blade for engaging an exterior side wall of the gutter, the exterior side wall of the gutter being away from a roof;
   said third edge of said cleaning blade for engaging an interior side wall of the gutter, the interior side wall of the gutter being adjacent to the roof;
   said third edge of said cleaning blade being shorter in length than said second edge of said cleaning blade;
   said fourth edge of said cleaning blade physically intersecting said third edge of said cleaning blade, said fourth edge of said cleaning blade being orthogonal to said third edge of said cleaning blade and parallel to said first edge of said cleaning blade;
   said fifth edge of said cleaning blade engaging said handle and attaching to said handle;
   said fourth edge of said cleaning blade physically intersecting said fifth edge of said cleaning blade to form a physical angle, said physical angle being greater than ninety degrees;
   said handle following said fifth edge of said cleaning blade;
   said handle extending beyond the gutter in a direction away from the roof.

6. The gutter cleaning tool as claimed in claim 5, further comprising:
   a shovel blade attached to said handle at an end of said handle opposite said cleaning blade.

7. The gutter cleaning tool as claimed in claim 6, wherein said shovel blade include drain holes therein.

8. The gutter cleaning tool as claimed in claim 5, further comprising:
   a striking member attached to said handle at same end of said handle as said cleaning blade.

\* \* \* \* \*